INVENTORS.
HOWARD L. WIRSING
WILLIAM C. MILLER
BY
Bernard E. Franz
ATTY.

Oct. 6, 1970 H. L. WIRSING ET AL 3,533,073

DIGITAL CONTROL AND MEMORY ARRANGEMENT, PARTICULARLY FOR A COMMUNICATION SWITCHING SYSTEM

Filed Sept. 12, 1967 8 Sheets-Sheet 4

United States Patent Office 3,533,073

Patented Oct. 6, 1970

3,533,073

DIGITAL CONTROL AND MEMORY ARRANGEMENT, PARTICULARLY FOR A COMMUNICATION SWITCHING SYSTEM

Howard L. Wirsing, Lisle, and William C. Miller, Glen Ellyn, Ill., assignors to Automatic Electrical Laboratories, Inc., a corporation of Delaware

Filed Sept. 12, 1967, Ser. No. 667,170

Int. Cl. G06f *9/18*

U.S. Cl. 340—172.5 20 Claims

ABSTRACT OF THE DISCLOSURE

Common control equipment comprises three subsystems (1) a register-sender, (2) a translator and route selector and (3) a trunk scanner. The memory access arrangement provides a cyclically recurring word time which is divided into three time periods assigned to the three subsystems respectively for memory access. Each subsystem reads a word from memory during one word time cycle, performs processing operations making use of the data of that word, and rewrites the same or modified data for that word at the end of its word time cycle, and then changes to a different memory address.

CROSS-REFERENCES TO RELATED APPLICATIONS

The preferred embodiment disclosed herein is part of the system covered by a Murphy et al. U.S. Pat. 3,328,534 issued June 27, 1967, for a Communication Switching System. The switching network and marker of the system is described in U.S. patent application S.N. 463,587, filed June 14, 1967, now Pat. No. 3,413,421, by A. S. Cochran et al. for an Identifying Arrangement for Communication Switching Systems. The register-sender subsystem makes use of a time division multiplex arrangement in which the memory has a plurality of rows assigned to each register as covered by U.S. Pat. 3,299,214, issued Jan. 17, 1967, to K. E. Prescher et al. for a Communication Switching System Common Control Arrangement; this feature also being used in the system described in the D. K. K. Lee et al. U.S. Pat. 3,301,963, issued Jan. 31, 1967, for a Register-Sender Arrangement for a Communication Switching System Common Control Arrangement.

BACKGROUND OF THE INVENTION

Field of the invention

This invention relates to digital data processing systems with storage devices, and more particularly to a common control arrangement for a communication switching system using a ferrite core memory arrangement.

Description of the prior art

There are many known systems in which different units share both data processing circuits and memory access time, some such systems being on a random access basis and others having cyclically recurring time intervals. U.S. Pat. 3,334,333, for example, discloses a system in which peripheral units are permitted access to the memory whenever the data processor does not require access of the same memory. There are also many systems in which several users share the same data processor so that each user appears to have continuous use of the processor, with either cyclically recurring access, or some other arrangement for handling access requests with some type of priority.

In communication switching systems with common control, a register arrangement is required to store the called-number digits for several originating calls in which dialing or other call signals are being received simultaneously.

This is done by providing a register arrangement for each call, with each register allotted a time to sample the received signals and store information in accordance therewith. The common control equipment also may include a translator for interpreting the stored digits and providing routing information for operation of the switching network. In many such systems the registers share common processing logic circuits with each having an individual section in a common memory, each register having cyclically recurring use of the logic circuits along with access to the memory. In such systems the translator usually is provided with a separate memory having its own access circuits. The systems described in the above Prescher et al. and Lee et al. patents are of this nature. It would be desirable to use a single memory with the same set of access circuitry for the different functions. However the registers must each be provided with access to their common logic circuits and the memory at definite intervals to completely receive the dialed digits or other call signals, and a certain amount of time is required by the logical processing circuits to process the data. To adequately process the data for all of the registers, one at a time, sharing the register subsystem logic circuits, may require all of the available time if adequate sampling to record and process the received digital information is to be accomplished.

SUMMARY OF THE INVENTION

According to the invention a plurality of digital data processing subsystems share the same memory, using common access circuitry, with a cyclically recurring word time for memory access and processing of a memory word by each subsystem, the word time cycle being provided with a time period for each subsystem for access to the memory, with each subsystem during its access time having an interval to write one word, change the address to that of a different word, and to read the new word from memory. The subsystem then performs processing operations using the data of the word read from memory, while the other subsystems are provided with access to the memory during their access time periods. Each subsystem is provided with its own address generator, which may be arranged to receive random addresses from its subsystem, or may generate the addresses sequentially. One or more of the subsystems may be associated with a plurality of peripheral units, each of which is individually associated with a section of the memory; and more specifically each peripheral unit is individually assigned one or more memory addresses, and the data processing circuits of that subsystem are associated with the particular peripheral unit related to the address being generated for that subsystem.

In an embodiment of the invention incorporated in the common control equipment for a communication switching system the subsystems may include a register subsystem and a translator subsystem, with the register subsystem being associated with a plurality of peripheral units such as register junctors. The register junctors are assigned cyclically recurring time slots during which common logic circuits of the register subsystem are used for processing data releated to that junctor, and access is provided to the memory for storage and processing of data associated with that register junctor.

A feature of the invention relates to the arrangement of said Prescher et al. patent wherein each register-junctor is associated with a plurality of memory rows each having its own address, in combination with a translator subsystem sharing access to the same memory during different time periods of a memory word cycle.

A further feature of the invention provides that a transfer buffer is used to transfer information from a memory word associated with one subsystem to another one of the subsystems in accordance with processing of the data. Specifically, according to this feature digits stored for one of the register junctors and processing data associated therewith may be transferred to the transfer buffer for processing by the translator; and routing information found by the translator may be supplied via the transfer buffer to be stored in the register junctor's memory section for use in controlling the switching network or for sending to another switching office.

An advantage of the invention is that data processing logic circuits may be used which are relatively slow, and still take maximum advantage of a somewhat faster memory access time, since each of the subsystems may be processing a word while other subsystems are provided access to the memory. Thus in a communication switching system the register subsystem may have logic circuits which are shared by register junctors, with there being a register junctor using the register logic circuits at all times, while still providing time for the translator and other circuits to have access to the same memory.

Further according to the invention, a trunk scanner is provided which also shares access to the memory, so that each word time cycle has a time period for the register-sender subsystem, a time period for the translator and route selector subsystem, and a time period for the trunk scanner subsystem.

The above-mentioned and other objects and features of this invention and the manner of obtaining them will become more apparent, and the invention itself will be best understood, by reference to the following description of an embodiment of the invention taken in conjunction with the accompanying drawings comprisig FIGS. 1–8 wherein.

DESCRIPTION OF THE PREFERRED EMBODIMENT

Figure 1:
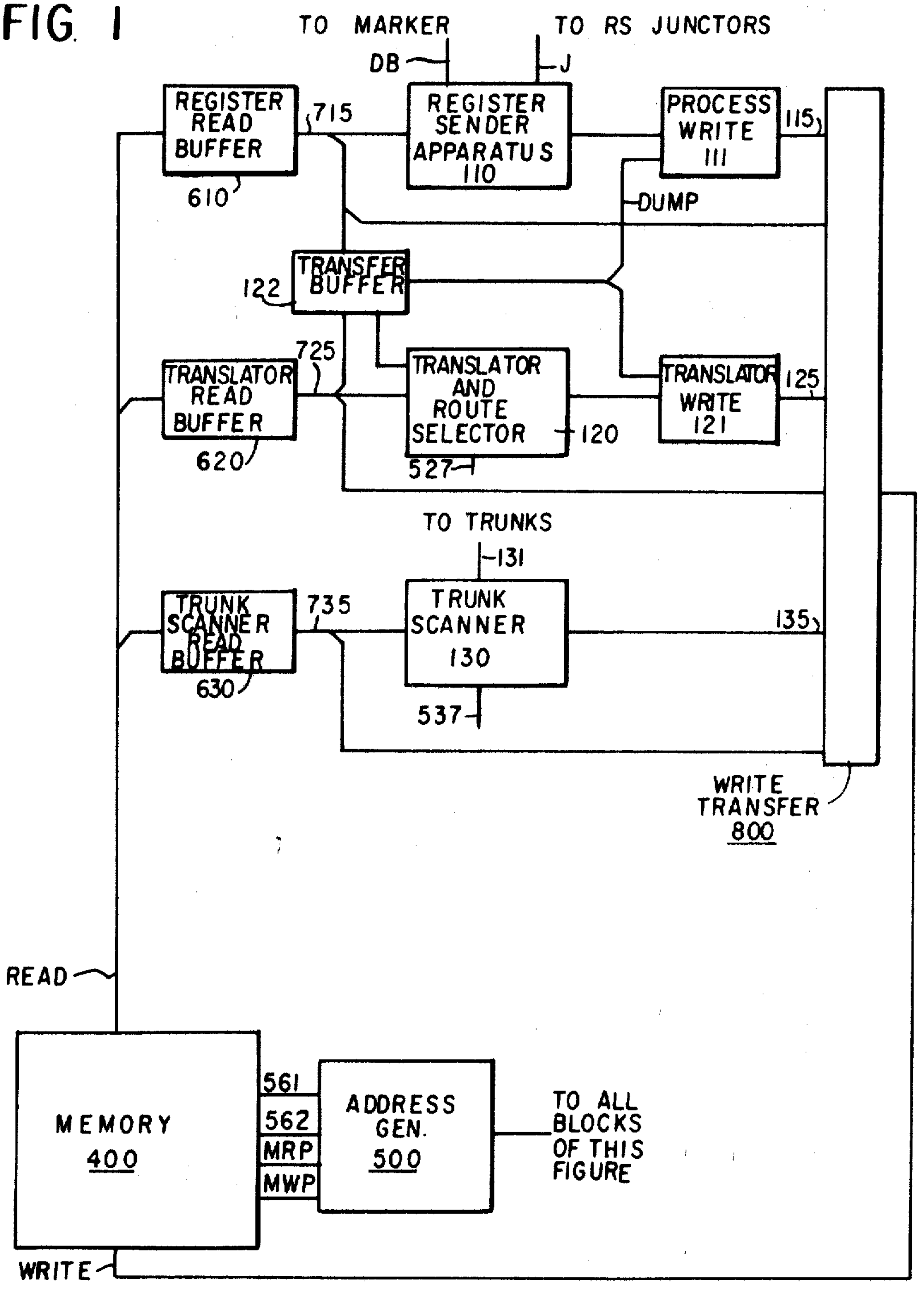
FIG. 1 is a block diagram of a digital control and memory arrangement, comprising the common control equipment for a communication switching system.

The digital control and processing circuits include flip-flop storage devices and various logic gates. Each of the flip-flops includes two transistors in a bistable circuit configuration. Each flip-flop has eight input terminals and two output terminals. To set a flip-flop to state one, producing a true indication, requires coincidence of a signal on a D.C. input and a trigger pulse on an A.C. input; and in like manner to reset it to state zero, indicating a false condition, requires coincidence of a D.C. input and an A.C. input. The flip-flops are shown in the drawings as having the inputs on the left-hand side with one or two small coincidence gates on the upper half to set the flip-flop and one or two similar coincidence gates on the lower half for reset. Each such coincidence gate is shown with the A.C. or trigger pulse input at the center of its left side, and the D.C. or control input at the top or bottom. The outputs are shown with the state one output at the top and the state zero output at the boom on he right-hand side.

Gated pulse ampliers are shown as triangles with four input leads on the base on the left-hand side and an output at the apex on the right-hand side. The upper input on the left-hand side is a capacitance-coupled trigger-pulse input terminal, and the other three inputs are for D.C. control inputs. The circuit is arranged so that unused D.C. inputs do not have any effect on the operation. If there is a connection shown only to the second input lead the signal thereon when true enables the amplifier to pass the pulse supplied to the upper input. If there are connections to the second and third inputs, they act as an AND circuit so that only when both of these inputs are true is the amplifier enabled to pass the pulse at the upper input. If there is also a connection to the lower input it acts as an OR circuit with the other control inputs so that when it is true it enables the amplifier. If the gated pulse amplifier has a connection only to the upper input then it always passes a pulse supplied thereto.

The logical operations are performed by direct coupled resistance-transistor logic in the form of NOR gates. However, for simplicity of disclosure the gates in the drawings are shown as being either AND gates as indicated by a line across the gate parallel to the base, or as OR gates indicated by a diagonal line.

Typical schematic diagrams of these circuit elements are illustrated in said Lee et al. patent, FIG. 78.

In this system the true condition of a signal, the one state, is represented by a negative eight-volt potential; while the false condition of a signal, the zero state, is represented by ground potential.

Figure 7:
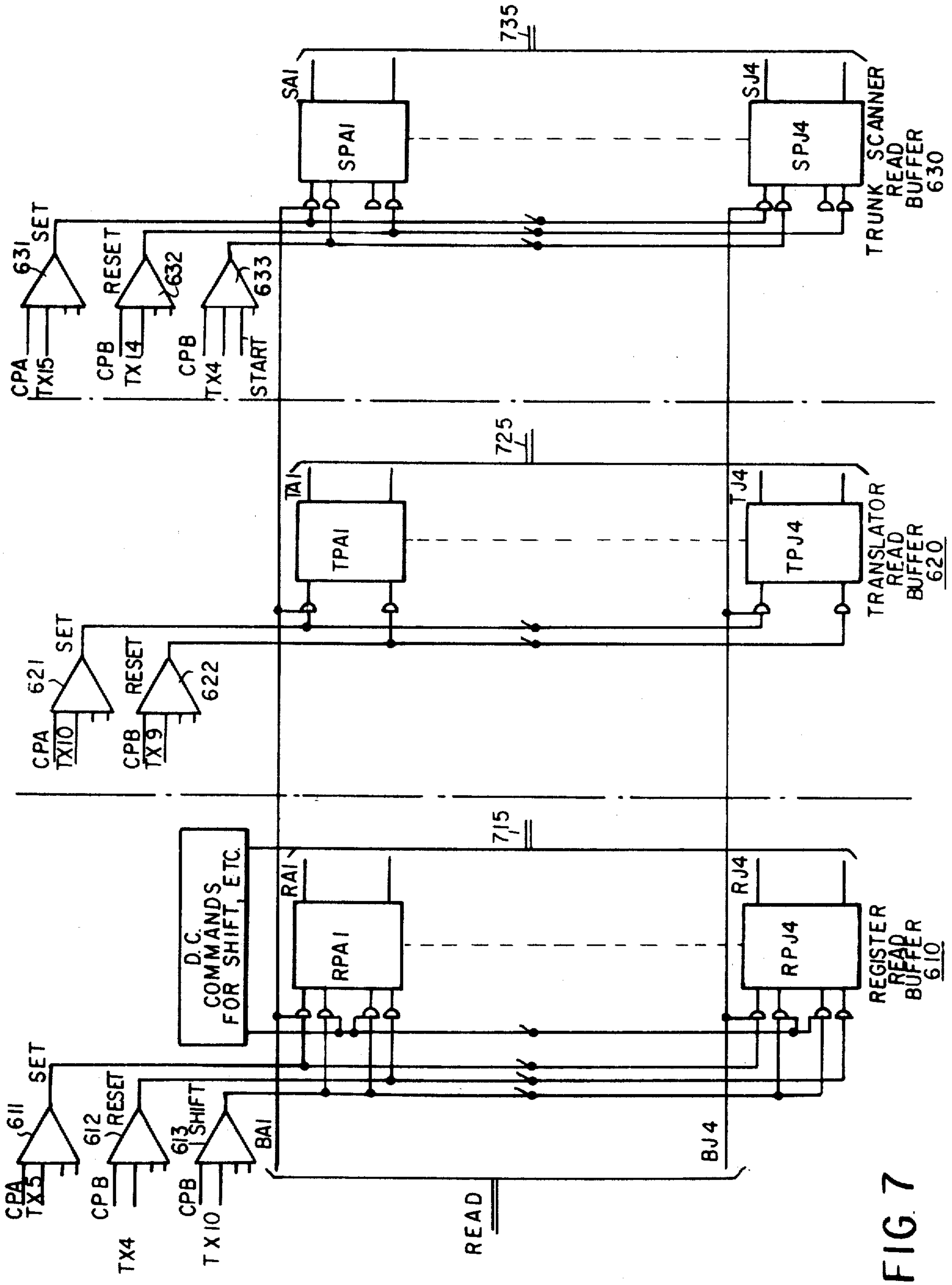
FIG. 7 is a functional block diagram of the read-out buffers for the different subsystems.
Figure 8:
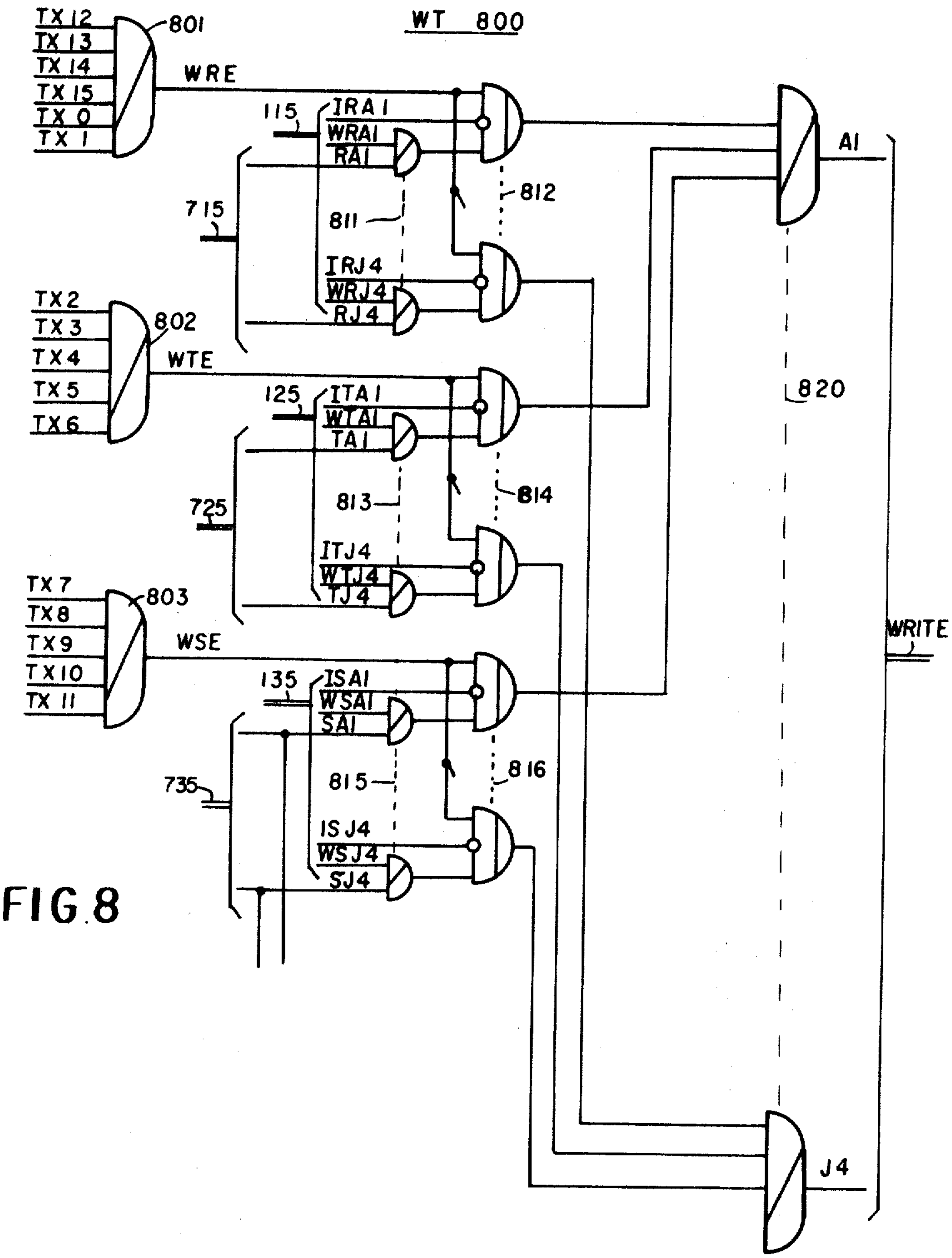
FIG. 8 is a functional block diagram of the common write circuits.

OUTLINE (A) Common Digital Control Equipment (FIG. 1)
(B) Communication Switching System (FIG. 3)
(C) Operation of Control Equipment for the Switching System (FIGS. 1 and 2)
(D) Other Common Control Equipment (FIG. 1)
(E) Memory (FIG. 4)
(F) Address Generator (FIGS. 5 and 5A)
    (F1) Word time cycle
    (F2) Addressing of subsystems with word time sharing
    (F3) Register address generator (FIG. 6)
    (F4) Register sender subsystem time division multiplex timing arrangement
    (F5) Translator and trunk scan address generator
(G) Memory Reading (FIG. 7)
(H) Memory Writing (FIG. 8)

(A) Common Digital Control Equipment (FIG. 1)

The digital control and memory arrangement which provides the common control equipment for a communication switching system is shown in FIG. 1. A first subsystem comprises register-sender apparatus along with a register read buffer 610 and process write control circuits 111. A second subsystem comprises a translator and route selector 120 along with a translator read buffer 620 and write control circuits 121; and also a transfer buffer 122 which provides for communication with the register-sender subsystem and for other functions. A third subsystem comprises a trunk scanner 130 along with a trunk scanner read buffer 630.

All of the above subsystems make use of the same memory assembly 400. This is a destructive readout type ferrite core memory of the word organized or linear select type. An address generator 500 supplies the signals for reading and writing the words in and out of the memory, and supplies appropriate timing signals to all of the blocks of the common control equipment. The timing signals are shown in a set of graphs of FIG. 2.

Figure 3:
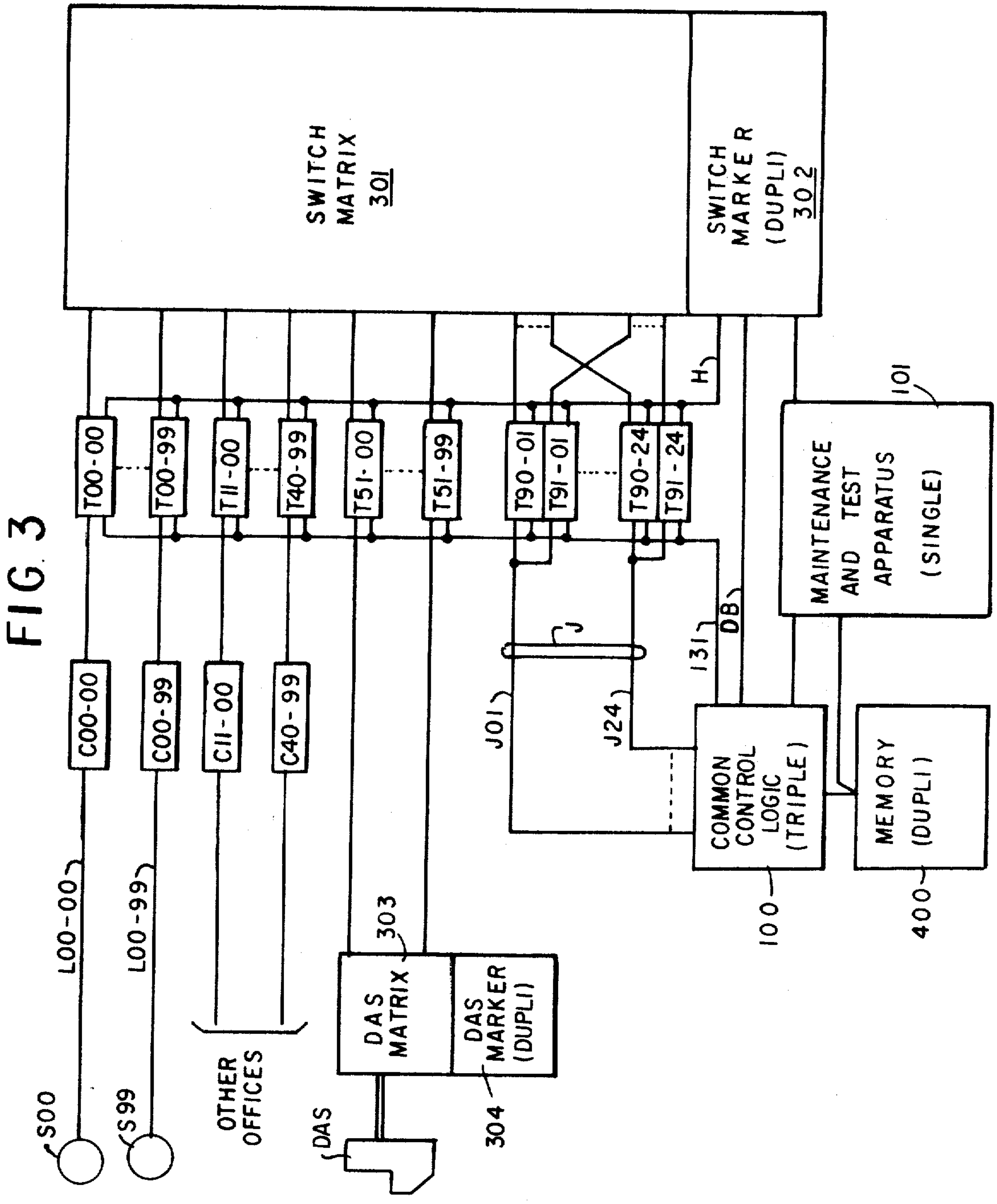
FIG. 3 is a block diagram of the communication switching system.

(B) Communication Switching System (FIG. 3)

The communication switching system is shown by a single line block diagram in FIG. 3. This is the system disclosed in the Murphy et al., U.S. Pat. No. 3,328,534. The switch matrix 301 and marker 302; and the line, trunk and junctor circuits T00–00 through T91–24 are shown in a copending U.S. patent application for an Identifying Arrangement for Communication Switching Systems by A. S. Cochran et al., Ser. No. 463,587, now Pat. No. 3,413,421, filed June 14, 1965. This is basically a tandem switching center, although there are some subscriber lines L00–00 through L00–99 for pushbutton tone dialing subscriber stations S00 through S99 respectively. These lines are served by the switch matrix termination line circuits shown, for example as T00–00 through T00–99. Trunk circuits T11–00 through T40–99 are shown for serving trunk lines to other offices. Both the subscriber lines and the trunk lines may be provided with transmission equipment C00–00 through C40–99 which may for example be carrier equipment. There is a dial assistance switchboard DAS which has operator positions connected through a separate switching matrix 303 having its own marker 304 with lines connected for example through trunk circuits T51–00 through T51–99 to switching matrix terminals. There are a plurality of register-junctors, each comprising a register terminal circuit and a sender terminal circuit, for example the first junctor comprises a register terminal circuit T90–01 and a sender terminal circuit T91–01 and the last junctor comprises a register terminal circuit T90–24 with a sender terminal circuit T91–24.

The common control equipment for the switching system includes common control logic 100 which is triplicated, and the memory 400 which is duplicated. There is also maintenance and test apparatus 101 which is provided singly (not duplicated). The common control logic comprises all of the units shown in FIG. 1 except for the memory 400. Associated with the triplication of the common control logic and the duplication of the memory there are comparison and transfer circuits which are not shown in FIG. 1 or in any of FIGS. 4–9.

(C) Operation of Control Equipment for the Switching System

To briefly explain the operation of the system, assume that a call is originated at station S00. The call request is detected in the line circuit T00–00 and provides a signal over a conductor of a set of conductors H to the switch marker. The switch marker identifies the calling line circuit, and supplies its line equipment number over a set of conductors DB to the register-sender apparatus 110 (FIG. 1). The register-sender apparatus selects an idle one of the register-sender junctors, and then returns both the originating line equipment number T00–00 and the register terminal equipment number such as T90–01 to the switch marker. The marker finds an idle path through the switch matrix between these two terminals and causes a four-wire connection to be established. The register-sender apparatus then returns dial tone through the register junctor and the matrix connection to the line equipment T00–00, and from there via the line to the station S00. The calling subscriber then operates his push button set to supply a number of digits, which may for example include a priority digit and a called line directory number.

There is a portion of the memory 400 comprising a plurality of rows which is individually associated with each of the register-sender junctors, in which all information relating to the progress of a call during seizure and dialing is recorded. This information is supplied from the register-sender apparatus via process write control circuit 111 which can control the writing or inhibiting of a bit of information in each of the register-sender words. This information is supplied via the common write circuits 800 and the set of conductors WRITE into the memory in rows designated by the address generator 300 in a subsequent multiplex cycle when this address is again generated the information is read from the memory via conductor set READ into the register read buffer 610. This information is used by the register-sender apparatus in processing the call, and any bits which are not modified are recirculated directly from the buffer 610 to the common write circuits 800 and rewritten in the same row of the memory.

Each of the digits keyed by the subscriber at station S00 in the call being described is received via the terminal T90–01 and junctor line J11 in the register-sender apparatus and is recorded in the memory via the circuits 111 and 800.

The transfer buffer 122 provides for communication between the register-sender apparatus and the translator and route selector. Whenever the register-sender apparatus needs the services of the translator and route selector on a particular call it generates a request digit which is recorded in the memory. Then on the next multiplex cycle this request indication appears in the register read buffer 610, and is detected in the transfer buffer 122. The translator and route selector 120 can serve only one call at a time; and therefore when it is seized a busy indicating device is set in the transfer buffer, and an indication is supplied via the process write circuit 111 to write an indication in the memory associated with that particular register to mark it as the one which is using the translator.

The portion of the memory associated with the translator and route selector includes sections for information associated with the line and trunk circuit equipment, some of which is "semi-permanent" such as the type of line or trunk circuit, and the class of service which may be provided, and translation information relating directory numbers and equipment numbers; and also "temporary" information such as the busy-idle status of each of the trunk circuits, and the priority rating of any call using that circuit. The translator write circuits 121 can be used to modify the temporary information. The permanent information read into the translator read buffer 620 is rewritten via the write transfer circuits 800.

In the call being described, the first seizure of the translator occurs when the calling line service request has been received in the register-sender apparatus from the switch marker, and a register has been assigned. At this time the translator is seized and the calling line equipment number which has been stored in the memory is supplied from the register read buffer 610 to the transfer buffer 122. The translator then looks up this number in memory using the translator read buffer 620, and supplies class mark information associated therewith via the transfer buffer 122, and thence via the process write circuits 111 to write this information in the register memory. The next seizure of the translator occurs after a given number of digits have been dialed, these digits being supplied from the register memory via the register read buffer 610 to the transfer buffer 122. The translator and route selector 120 then uses the translator read buffer 620 to find information relating to the code identified by these digits. Instructions for the register and possible routing information are supplied via the transfer buffer and the process write circuits 111 to the register memory. The seizure of the translator may similarly be repeated after additional digits are received.

When the register has sufficient routing information and instructions from the translator, assuming that is an outgoing call to be routed via another office, it supplies the equipment number of the sender which is 91–01, along with the equipment number of selected outgoing trunk such as 40–99, this information being supplied via the set of conductors DB to the switch marker. The switch marker causes a path to be found and a connection to be established through the switch matrix between these two network terminals. Digits are then generated and transmitted from the register-sender apparatus via line JO1 to the sender junctor, and transmitted through the switch matrix connection and the outgoing trunk circuit to the other office. After the completion of sending, information is supplied via the set of conductors DB to the switch marker to cause it to release the connections from the register junctor and the sender junctor and to establish a direct connection through the switch matrix between the calling line circuit T00–00 and the outgoing trunk circuit T40–99. The register and sender junctors and the associated information in memory are then returned to the idle state.

(D) Other common control equipment

The trunk scaner has a set of conductors 131 with a connection to each of the line and trunk circuits to detect when each becomes idle. The trunk scanner includes a relay connect arrangement to connect to a group of trunks and supplies the address for the first trunk of the group to the address generator 500. The addresses for the trunks of this group are then generated in sequence read out into the trunk scanner read buffer 630, the status checked and written into the memory via the write transfer circuits 800. This section of the memory can be accessed both by the trunk scanner 130 and by the translator and route selector 120.

Figure 4:
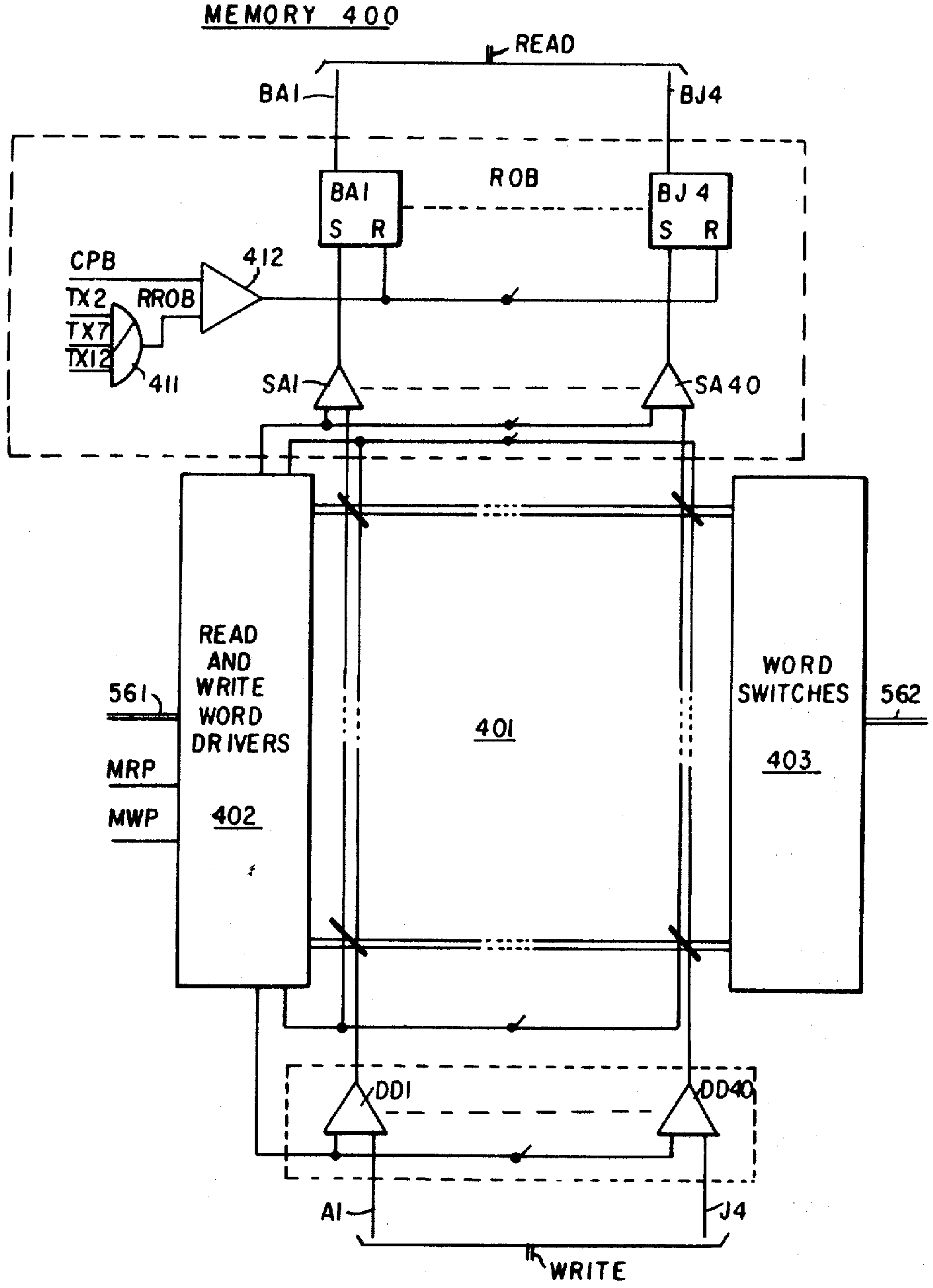
FIG. 4 is a functional block and symbolic diagram of the memory and its access circuits.

(E) Memory (FIG. 4)

The memory is shown in FIG. 4. It comprises a ferrite core array 401 along with read and write circuits. The memory as actually constructed comprises up to six modules, with each module consisting of 1152 words. Electrically the array can be considered as a plurality of columns and rows with each row comprising one word. Each row comprises 44 cores, of which only the first and the 40th are shown in the first and the last row. Forty of the cores in each row are used to store the forty bits of a word, while the other four bits are used for parity checking purposes and therefore are not shown in any of the drawings. Each row has a unique word address designated by A, B, C, D, and E digits with respective values of 1 out of 8, 1 out of 4, 1 out of 6, 1 out of 6, and 1 out of 6. The E digit designates the particular core module. The address row is selected by the combination of read and write word drivers 402 shown on the left side of the array, and word switches 403 shown on the right side of the array. There are twenty-four read drivers and twenty-four write drivers, with each combination of a B digit and a C digit designating one read driver and one write driver. The address generator also supplies read and write pulses to actuate the selected read or write driver respectively. Each of the word switches is designated by the combination of A, D, and E digits. The word drivers and the word switches are interconnected by wires threaded through the rows of cores shown. The columns of the array are threaded by write conductors from digit drivers DD1–DD40 respectively, and also by sense conductors to sense amplifiers SA1–SA40 respectively. The outputs of the sense amplifiers are used to set flip-flops BA1–BJ4 in a readout buffer ROB. The forty bits of a word are grouped into ten digits, each with a 1 out of 16 value, and each comprising four bits. The ten digits are designated A through J. Thus flip-flop BJ4 stores the fourth bit of the J digit.

Figure 5:
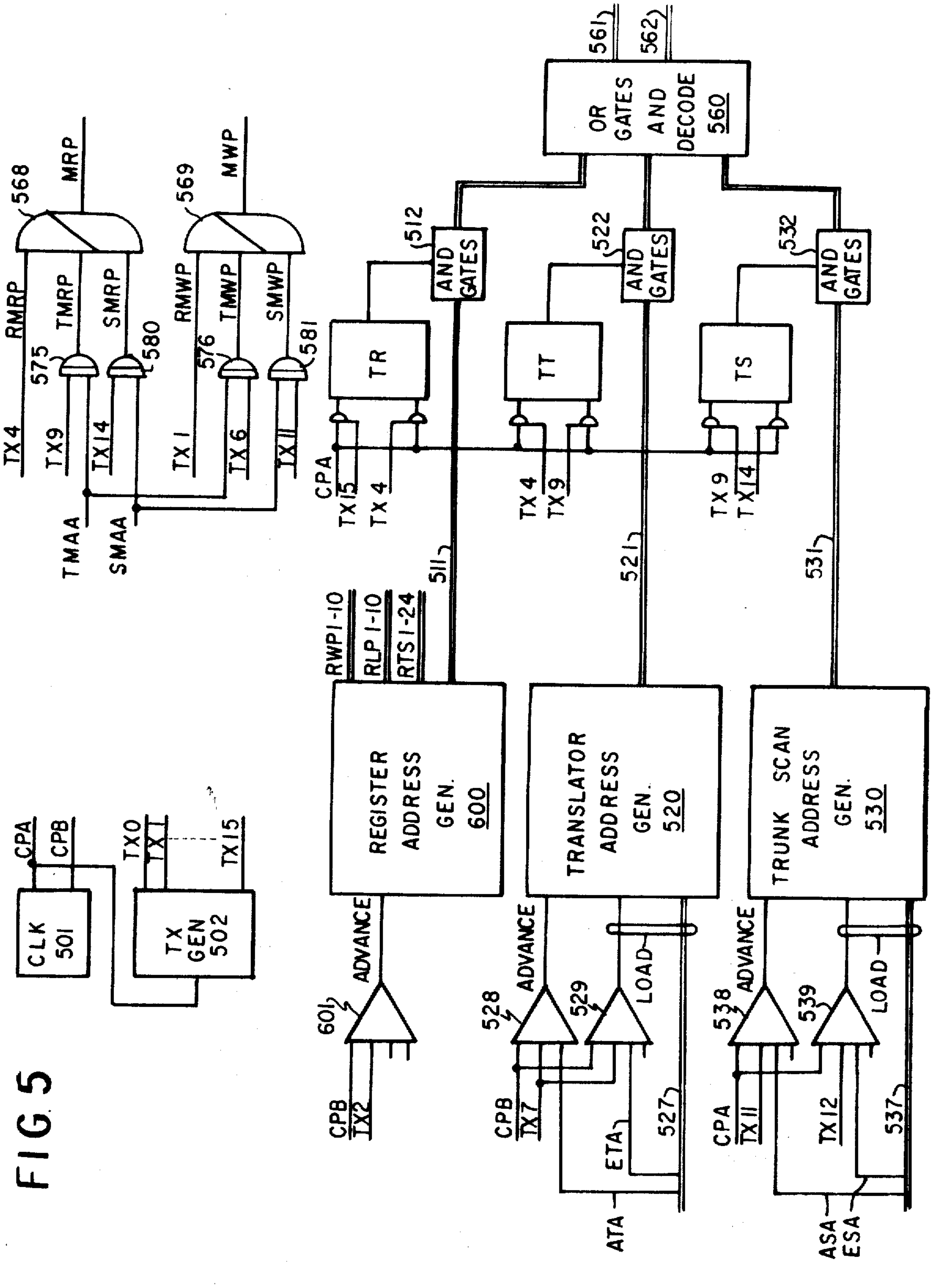
FIG. 5 is a functional block diagram of the address generators.

(F) Address Generator (FIGS. 5 and 5A)

Figure 2:
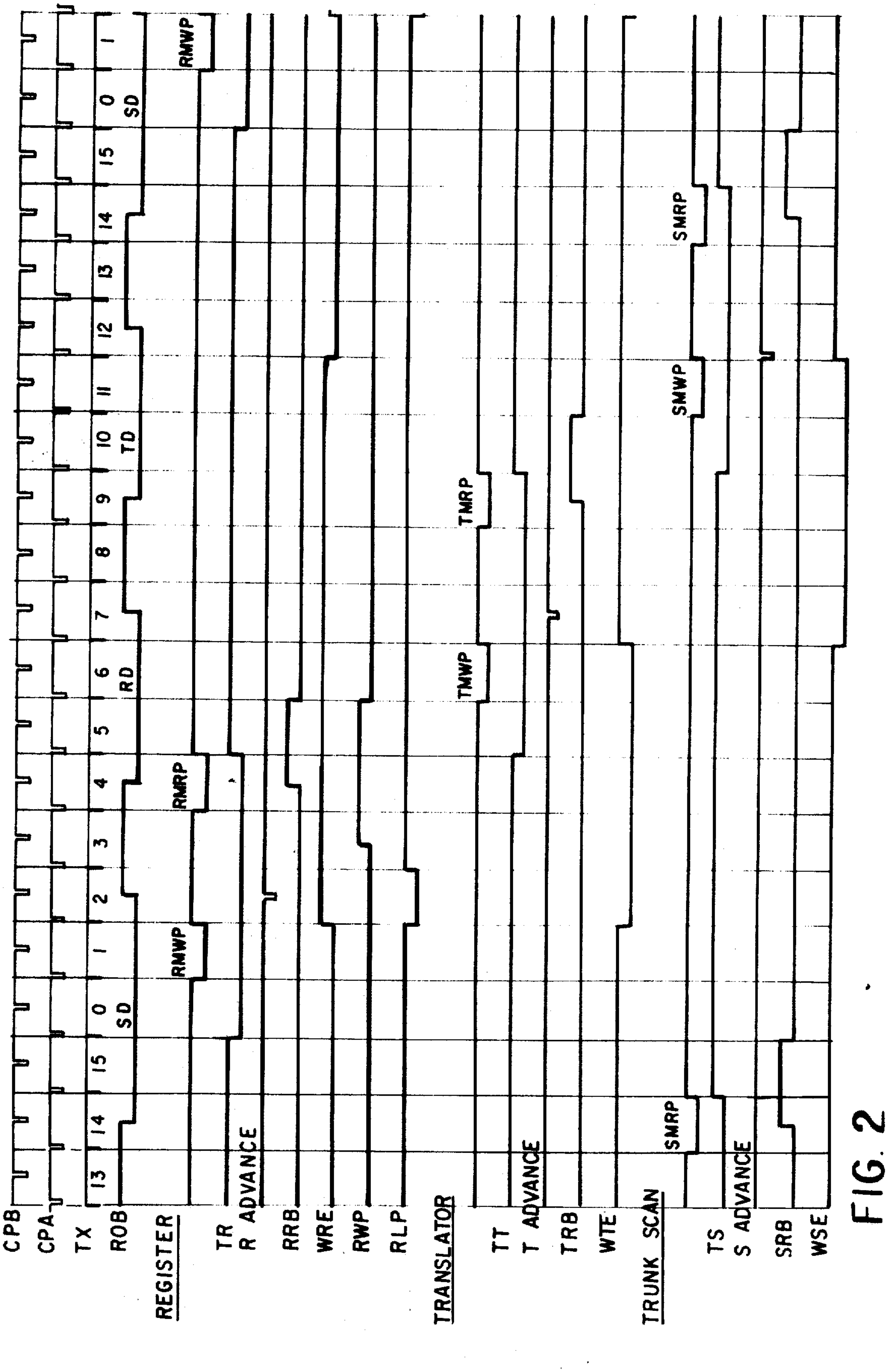
FIG. 2 is a timing graph explaining the operation of the system.

The address generator 450 is shown in FIG. 5. The circuit shown in this figure is part of the triplicated common control logic, except for the basic clock CLK which is common. The clock provides two clock pulse trains CPA and CPB. Both trains consist of one microsecond pulses that occur at a 100 kilohertz rate, with the two trains being displaced in time from one another by five microseconds, as shown at the top of FIG. 2. These pulses are used as the clock pulse or AC input of flip-flops and gated amplifiers throughout the common control equipment.

(F1) Word time cycle

A TX generator which is basically a sixteen step ring counter produces a set of sixteen mutually exclusive ten microsecond pulses, TX0 through TX15 which occur in numerical order. The TX generator is driven by the CPA pulse train causing each TX pulse to begin with the leading edge of one CPA pulse and to end with the leading edge of the following CPA pulse. Upon reaching the TX15 time interval the generator then returns to TX0 to start another cycle.

A *memory word time* comprises one cycle of the TX generator, which is 160 microseconds. For each of the subsystems shown in FIG. 1, a word time may be defined as the time from the generation of the address of a word, fololwed by reading the word from the memory into the read buffer, until that word is written back into the memory. In all cases this time is sixteen steps of the TX generator or 160 microseconds. However, according to the invention three word times are interleaved so that the register-sender may process a different register word during every cycle of the TX generator, and the other subsystems of the common control equipment may also each process a word during sixteen steps of the TX generator.

(F2) Addressing of subsystems with word time sharing

The addresses to the memory word drivers and word switches are supplied from FIG. 5 via the OR gates and decode logic 560. There are three sets of input conductors to these OR gates, only one set at a time of which may be enabled to supply an address. Each of the five digits of the address is supplied in binary code, and is decoded for use by the memory. The A digit in binary code comprises three bits having values of 4, 2 and 1 respectively, and is decoded into one of the eight values 0, 1–7.

The B digit is binary coded with two bits having values of 2 and 1, and is decoded into one of the four values 0, 1, 2, 3. The C, D and E digits each are binary coded with three bits having values of 4, 2 and 1, and is decoded into one of the six values 1–6, the binary codes of 000 and 111 being unused. The decoded B and C digits are supplied via the set of conductors 561 to the read and write word drivers 402 in FIG. 4, and the decoded A, D and E digits are supplied via the set of conductors 562 to the word switches 403 in FIG. 4.

The register address is suppiled from the register address generator 600. The register access to the memory is governed by flip-flop TR, which is set by the CPA pulse at the end of the interval TX15 and reset at the end of the interval TX4 as shown by the graph TR in FIG. 2. While the flip-flop is set it enables the AND gates 512 to couple the output from the address generator 600 via the set of conductors 511 to the OR gates and decode logic 560.

The translator address is supplied via the translator address generator 520. The translator access to the memory is governed by flip-flop TT which is set by the pulse CPA at the end of the interval TX4 and reset at the end of the interval TX9 as shown by the graph TT in FIG. 2. When the flip-flop is set it enables the AND gates 522 to couple the outputs from the address generator 520 via the set of conductors 521 to the OR gates and decode logic 560.

The trunk scan address is generated by the trunk scan address generator 530. The trunk scan use of the memory is governed by flip-flop TS, which when set enables the AND gates 532 to couple the output of the address generator 530 via the set of conductors 531 to the AND gate decode logic 560.

The signals MRP and MWP for enabling the read and write drivers of the memory are shown generated in FIG. 5. The memory read pulse MRP is produced via gate 568 whenever any one of the three units provides a read pulse, and the memory write pulse MWP is produced via OR gate 569 whenever any one of the three units produces a write pulse. The register memory read and write pulses RMRP and RMWP are produced during every cycle of the TX generator in the intervals TX4 and TX1 respectively as shown in FIG. 2 in the first graph of the register. The translator memory read and write pulses TMRP and TMWP are produced in intervals TX9 and TX6 respectively, via gates 575 and 576, as shown in the first graph for the translator in FIG. 2, whenever the translator is requesting memory access by signal TMAA. The scanner memory read and write pulses are produced during intervals TX14 and TX11 respectively via gates 580 and 581, as shown in the first graph under the trunk scan portion of FIG. 2, whenever the scanner is requesting memory access by signal SMAA.

Figure 6:
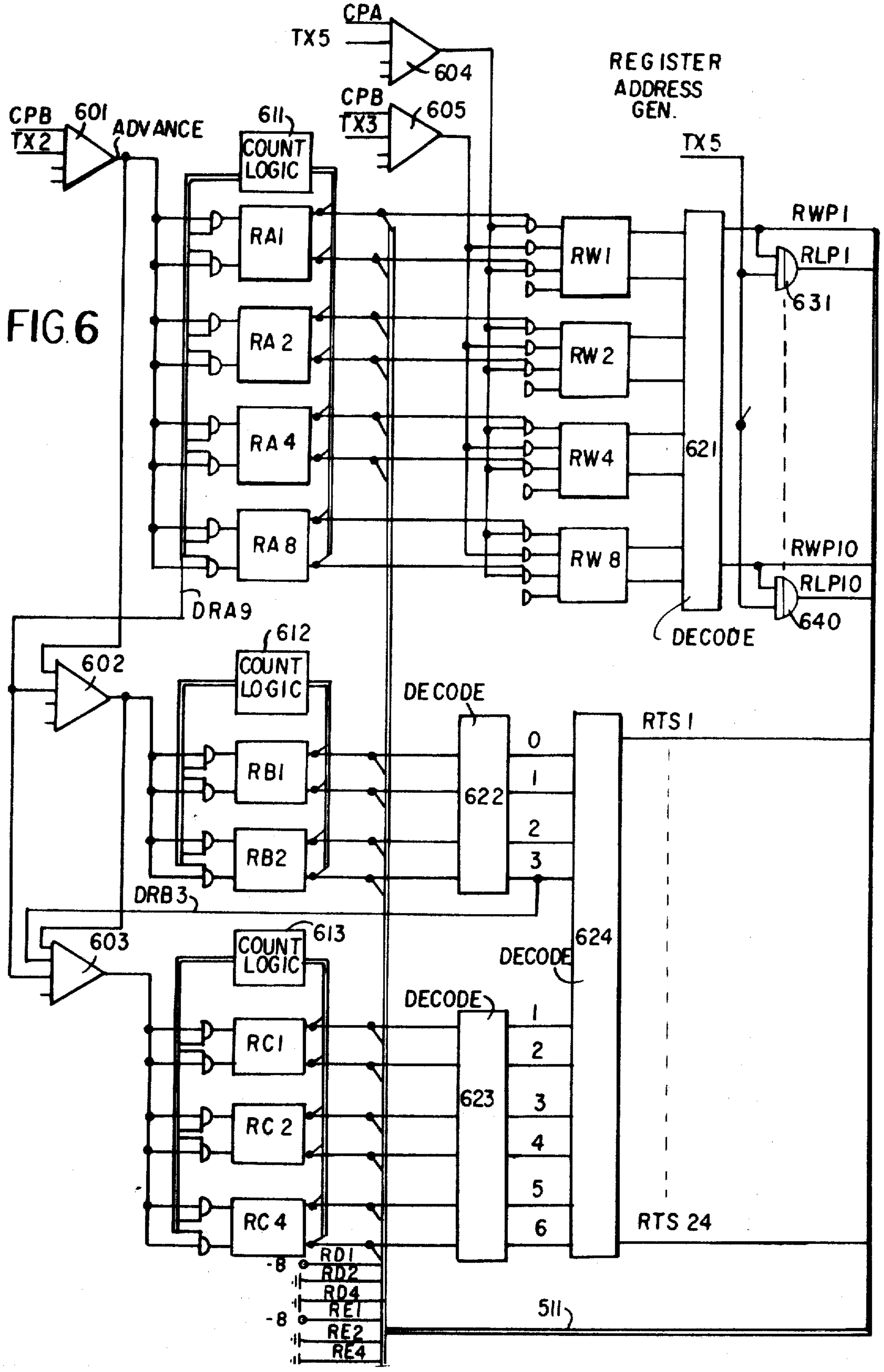
FIG. 6 is a more detailed block diagram of the register-sender address generator.

(F3) Register address generator (FIG. 6)

The register address generator 600 is shown by a functional block diagram in FIG. 6. The A digit address is generated by flip-flops RA4, RA2 and RA1; the B digit is generated by flip-flops RB2 and RB1, and the C digit is generated by flip-flops RC4, RC2 and RC1. The decoded D digit for the register address is always equal to "1," which is symbolized by showing signal RD1 at −8 volts potential and signals RD2 and RD4 at ground potential. Also the decoded E digit is always equal to "1" which is symbolized by the signal RE1 shown at −8 volts potential and the signals RE2 and RE4 at ground potential. The flip-flops for the A, B, and C digits are connected to act as counters, using count logic 611 for the A digit, count logic 612 for the B digit, and count logic 613 for the C digit. The address is advanced one step by a pulse from the output of gated pulse amplifier 601 when pulse CPB appears during the interval TX2. The A digit counter is provided with an additional flip-flop RA8 to provide for a cycle of ten counts, which permits the first two rows for each register to be accessed twice during a register time slot. The decoded output signals from the three flip-flops RA4, RA2 and RA1 provide the decoded values of 0–7 to address the eight words associated with one register. On the count advance signal from gated pulse amplifier 601 following the decoded value 7, flip-flop RA8 is set and flip-flops RA1, RA2 and RA4 are reset to provide a decoded value of 8. On the next count flip-flop RA1 is set to provide a decoded value of 9. On the next step the signal on lead DRA9 indicating the decoded value of 9 enables gated pulse amplifier 602, so that the next signal from gated pulse amplifier 601 resets the A count to 0 and at the same time a pulse from amplifier 602 advances the B counter one step. In a like manner when the decoded output of the B counter is equal to 3 as indicated by the signal on lead DRB3, and the A counter is again advanced to the value of 9 as indicated by the signal on DRA9, the gated pulse amplifier 603 will be enabled, so that the next advance pulse from amplifier 601 resets the A and B counters and advances the C counter one step. The C counter logic is arranged to advance the count from 1 to 6 and then recycle back to 1.

The particular register being addressed is determined by the B and C counters. The output of these counters via decoded logic units 622, 623 and 624 supplies the register time slot signals RTS1 through RTS24.

(F4) Register-sender subsystem time division multiplex timing arrangement

The common logic apparatus of the register-sender subsystem comprising in FIG. 1 the register-sender apparatus 110, the process write circuit 111 and the register read buffer 610 is used on a time division multiplex sharing basis by all of the register-sender junctors (the register-junctors are peripheral units for the register subsystem). The register-sender junctors are scanned sequentially in numerical order and each is allotted use of the common control for a period of 1.6 milliseconds (ten register word times) which is called a register junctor time slot. The time slot is identified by the combination of the B and C register address digits. The respective time slot enabling signals RTS1–RTS24 are provided via decode logic circuits 622, 623 and 624.

Associated with each register junctor there are eight memory words, which is a total of 192 memory words for the register-sender subsystem. The A digit counter flip-flops RA4, RA2 and RA1 select a word from the particular register-sender junctor subset.

The register-sender subsystem makes use of a "folded word" memory feature covered by U.S. Pat. 3,299,214 issued Jan. 17, 1967 to K. E. Prescher et al. for Communication Switching System Common Control Arrangement, this feature also being used in the system described in the D. K. K. Lee et al. U.S. Pat. 3,301,963. In the systems disclosed in those patents each register junctor has associated therewith six memory words the first of which is designated a control word and the other five of which are designated data words. The feature provides that during each register time slot the control word is accessed twice while each of the data words is accessed once. This requires a total of seven sub-time slots the first and seventh being used to access the control word, and the second through the sixth being used to access the respective data words. Thus the information from the control word may be stored in carry buffer devices and made available in processing the data word information, and at the end of the register time slot the information in the control word may be updated during its second access period. In the present system there are provided two control words and six data words, requiring a total of ten sub-time slots, each having a duration of one memory word. Therefore the A digit counter is provided with ten steps having decoded values of 0–9, with the first control word accessed when the A digit is equal to 0 or 8, the second control word accessed when the A digit is equal to 1 or 9, and the six data words accessed respectively when the A digit is equal to values of 2–7. It will be noted that the output of the flip-flops RA4, RA2 and RA1 is the same during steps 0 and 8, and is also the same during steps 1 and 9, so that the bits from these three flip-flops may be used for memory addressing via conductive set 511. Therefore the output of flip-flop RA8 is not supplied to the conductor set 511.

All ten count values of the A digit are required by the logic circuits in the apparatus 110 and 111. The contents of the flip-flops RA1, RA2, RA4 and RA8 are gated into the flip-flops RW1, RW2, RW4 and RW8 respectively on the CPA pulse that occurs at the end of the interval TX5 via gated pulse amplifier 604. The outputs of these flip-flops are then decoded to produce the register word pulse signals RWP1–RWP10 via decode logic 621. In conjunction with producing the register word pulse signals, the same set of decode logic output 621 are supplied through AND gates 631–640 in coincidence with the signal TX5 to produce the register latch pulses RLP1–RLP10 which are used to signify the ends of the respective register word pulses. The register latch pulses are used by the common logic to store information that is read from one memory word and that is needed to analyze information stored in another memory word during some later register word pulse occurring during the same register time slot. In addition the latch pulse RLP10 is used to reset certain latches in the common control at the end of the register time slot, thus not leaving any residual information for the next register-sender junctor.

The register time slot pulses, register word pulses and register latch pulses are supplied to the register-sender apparatus 110 and process write circuits 111, and also to the register-sender junctors to identify which is using the common logic circuits at that time. Thus it has been shown that the twenty-four register-sender junctors are identified by cyclically recurring respective time slot pulses enabling them to use the common register-sender logic apparatus on a time division multiplex basis, and that during each time slot there are ten sub-time slots for accessing eight words of the memory, and reaccessing two control words.

(F5) Translator and trunk scan address generators

The translator address generator 520 and trunk scan address generator 530 are each provided with three flip-flops for an A digit counter, two flip-flops for a B digit counter, three flip-flops for a C digit counter, three flip-flops for a D digit counter, and three flip-flops for an E digit counter. Each of these two address generators operate either in a sequential mode, or may be loaded with an address for a random mode. In operation the translator will first supply an address with the five digits in binary code via conductor set 527 and at the same time supply an "enter translator address" signal ETA. During the interval TX7 the clock pulse CPB is gated via gated pulse amplifier 529 to load the address into the generator 520. After there is an address loaded the translator may change to a sequential mode by generating the signal ATA. Upon the occurrence of the TX7 interval with ATA true the gated pulse amplifier 528 gates the clock pulse CPB to actuate the translator address generator as a counter and to advance it one step.

Similarly the trunk scanner may supply a random address in binary code via conductor set 537, and supply an "enter scanner address" signal ESA. Then during the interval TX12 the gated pulse amplifier 539 gates the pulse CPB to load that address. After an address has been loaded the address generator 530 may be operated in a sequential mode by supplying a signal ASA from the trunk scanner. During interval TX11 the signal ASA enables the gated pulse amplifier 538 to supply the clock pulse CPA to advance the address generator 530 one step as a counter.

The register advance pulses for the three address generators 600, 520 and 530 when operating in the sequential mode are indicated on FIG. 2. Note that the R advance pulse occurs during interval TX2 between a register memory write pulse in interval TX1 and a register memory read pulse in interval TX4, so that after one words is written the address is advanced and then another word is read. Likewise the translator advance pulse occurs in interval TX7 between the translator memory write pulse in interval TX6 and the translator memory read pulse in interval TX9, so that after a word is written, the generator is advanced and the next word is read. The scanner is advanced at the end of the interval TX11 following a scanner memory write pulse so that the following word will be read during interval TX14.

(G) Memory Reading (FIG. 7)

As shown in FIG. 4, the data from every word read from memory is supplied through the sense amplifiers SA1–SA40 to the read out buffer flip-flops BA1–BJ4. The data in these flip-flops is shown in FIG. 2 by the graph ROB.

The data is then supplied from the readout buffer ROB to one of the read buffers shown in FIGS. 1 and 7, or to the maintenance console register 151. As shown in FIG. 7 the register read buffer 610 comprises forty flip-flops RPA1–RPJ4, the translator read buffer comprises forty flip-flops TPA1–TPJ4, and the trunk scanner read buffer 630 comprises forty flip-flops SPA1–SPJ4.

The following description will trace data out of the memory during the memory word times, as shown in FIG. 2. Beginning with interval TX4 a clock pulse CPB via gated pulse amplifier 612 resets the register read buffer 610. During the same interval TX4 a register memory read pulse RMRP causes data from one word to be supplied to the register readout buffer ROB as indicated by RD in FIG. 2. During interval TX5 this information is set in the register read buffer by a clock pulse CPA via gated pulse amplifier 611. During interval TX7 the signal RROB from OR gate 411 enables the gated pulse amplifier 412 so that the clock pulse CPB resets the flip-flops BA1–BJ4.

Next during interval TX9 the gated pulse amplifier 622 supplies the clock pulse CPB to reset the translator read buffer 620. During interval TX9 the translator memory read pulse TMRP causes a translator word of data to be supplied to the readout buffer ROB as shown by TD in FIG. 2. During interval TX10 the gated pulse amplifier 621 is enabled so that a clock pulse CPA sets the translator read buffer 620 with this data. During interval TX12 the signal RROB from gate 411 again enables gated pulse amplifier 412 so that the clock pulse CPB resets the readout buffer ROB.

Next consider a trunk scanner word time. During interval TX14 the gated pulse amplifier 632 supplies a clock pulse CPB to reset the trunk scanner read buffer 630, and during the same interval a read pulse SMRP reads a word data from the trunk scanner into the readout buffer ROB as indicated by SD in FIG. 2. During interval TX15 the data is supplied to the trunk scanner read buffer 630 by a set signal from gated pulse amplifier 631. During interval TX2 the signal RROB from gate 411 enables gated pulse amplifier 412 to reset the readout buffer.

(H) Memory Writing (FIG. 8)

The write transfer circuit 800 is shown in FIG. 8. It comprises forty OR gates 820 to supply the forty bits A1–J4 to control the digit driver DD1–DD40 shown in FIG. 4. The write control commands comprising a write register enable signal WRE from OR gate 801, a write translator enables signal WTE from OR gate 802 and a write scanner enable signal WSE from OR gate 803 are used to control the time intervals at which each circuit is allowed to write into memory via the write transfer circuit. The write register enable signal WRE is true from TX12 through TX1, which allows fifty microseconds for the write information to propagate through the various circuits and ten microseconds for writing into the memory array. The process write circuits 111 may write or inhibit selected ones of the forty bits of a register word via the set of conductors 115. The write signals WRA1–WRJ4 are supplied via the forty OR gates 811 to the forty AND gates 812, while the inhibit signals IRA1–IRJ4 are supplied directly to inhibit inputs of the gates 812. In the absence of a signal from the process write circuits, any bit will be recirculated directly from the register read buffer 610 via conductor set 715 to the forty OR gates 811. The gates 812 are all enabled by the signal WRE to supply the word to the OR gates 820 and then supply the conductor set WRITE to the digit drivers in FIG. 4. In response to the write pulse RMWP the word is written into the memory.

Similarly, during generation of the signal WSE during intervals TX7–TX11, the trunk scanner can write into memory. The trunk scanner supplies signals by the conductor set 735 with write signals WSA1–WSJ4 to gates 815 and inhibit signals ISA1–ISJ4 to gates 816. The gates 816 are enabled whenever the output of gate 804 is true indicating a trunk scanner write interval.

While we have described above the principles of our invention in connection with specific apparatus, it is to be clearly understood that this description is made only by way of example and not as a limitation of the scope of our invention.

What is claimed is:

1. A digital control system comprising a plurality of subsystems, a memory having read and write access circuits common to said subsystems, each of said subsystems having individual thereto a read buffer, processing circuits, write control circuits and an address generator, interconnected with one another and with said memory circuits;

timing means providing cyclically recurring time signals with each cycle representing a memory word time, the cycle being of fixed duration and divided to provide a memory access period of fixed duration and in fixed sequence for each of the subsystems, with the period for each subsystem including a write interval, and address change interval, and a read interval in sequence; the timing means being connected to the read buffer, write control circuits, and address generator of each subsystem;

means including the connections to said timing means for each subsystem to set its address generator during its address change interval to one address and cause the word designated by that address to be read from memory during its read interval into its individual read buffer during one word cycle, means to perform data processing operations using the data of that word from its read buffer, and means to write into the memory at the same address during the write interval of its access period of the next word time cycle and then to cause its address generator to provide another address during its address change interval; so that while one subsystem has a word out of memory and is processing data the other subsystems may be provided with access to the memory during their periods of the word time cycle; means allowing each subsystem to change the setting of its address generator only during the address change interval of its individual memory access period, and whereby each subsystem uses said common read and write access circuits for any part of the memory only during its said access period of each cycle, and said access periods for the subsystems always occur in the same fixed sequence independently of any memory request signals.

2. The system as claimed in claim 1, wherein said memory comprises a plurality of rows of bistable storage elements, each row storing one word of information and having an address individual thereto, the two states for each storage element being designated "one" and "zero," the memory being of the destructive read type in which a signal to all of the elements in the row being addressed changes the elements in that row which are in the "one" state to the "zero" state to produce an output signal therefrom, the elements in "zero" state remaining therein without producing an output signal, and a write signal to the elements in the row being addressed sets selected elements of the row to the "one" state and leaves others in the "zero" state in accordance with coincident input signals;

wherein each of the subsystems includes means to supply information signals directly from its individual read buffer to the common write circuits to rewrite the same information in the elements of the row being addressed, and at least one of the subsystems includes individual write control circuits with means to override the signals from the read buffer to selectively write in selected elements to modify the word information.

3. A system as claimed in claim 2, wherein at least one of said subsystems is of the type which has part of its stored information semipermanent, being always rewritten directly from its individual read buffer without modification, in its normal data processing mode operation.

4. The system as claimed in claim 3, wherein said memory is of random access construction, and wherein the address generator of at least one of said subsystems includes means to receive addresses at random or alternatively to advance sequentially in accordance with signals from its subsystem.

5. The system as claimed in claim 4, wherein for at least one of said subsystems there are a plurality of peripheral units, and wherein the address generator of that subsystem includes means which supplies cyclically recurring time slot signals individual to the peripheral units, so that each peripheral unit during its time slot has exclusive use of the processing circuits of the subsystem; each peripheral unit having an individual section of the memory to which the subsystem has access during the time slot of that peripheral unit.

6. A system as claimed in claim 1, wherein for at least one of said subsystems there are a plurality of peripheral units, and wherein the address generator of that subsystem includes means which supplies cyclically recurring time slot signals individual to the peripheral units, so that each peripheral unit during its time slot has exclusive use of the processing circuits of the subsystem; each peripheral unit having an individual section of the memory to which the subsystem has access during the time slot of that peripheral unit.

7. A system as claimed in claim 6, wherein at least one of the subsystems other than that having said peripheral units associated therewith includes means for its address generator to receive addresses at random in accordance with signals from its subsystem.

8. In a communication switching system, a digital control system comprising a plurality of subsystems, wherein one of the subsystems is a translator subsystem with means to receive digital signals and to supply corresponding call routing information;

a memory having read and write access circuits common to said subsystems, each of said subsystems having individual thereto a read buffer, processing circuits, write control circuits and an address generator, interconnected with one another and with said memory circuits;

timing means providing cyclically recurring time signals with each cycle representing a memory word time, the cycle being divided to provide a memory access period for each of the subsystems, with the period for each subsystem including a write interval, an address change interval, and a read interval in sequence; the timing means being connected to the read buffer, write control circuits, and address generator of each subsystem;

means including the connections to said timing means for each subsystem to set its address generator during its address change interval to one address and cause the word designated by that address to be read from memory during its read interval into its individual read buffer during one word, cycle, to perform data processing operations using the data of that word from its read buffer, and to write into the memory at the same address during the write interval of its access period of the next word time cycle and then to cause its address generator to provide another address during its address change interval; so that while one subsystem has a word out of memory and is processing data the other subsystems may be provided with access to the memory during their periods of the word time cycle; means allowing each subsystem to change the setting of its address generator only during the address change interval of its individual memory access period, and whereby each subsystem uses said common read and write access circuits for any part of the memory only during its said access period of each cycle, and said access periods for the subsystems always occur in the same fixed sequence independently of any memory request signals.

9. The system as claimed in claim 8, wherein one of said subsystems is a register subsystem with means to receive digital signals relating to a plurality of calls, and to record the digital signals in corresponding sections of the memory;

wherein each of the subsystems includes means to supply information signals directly from its individual read buffer to the common write circuits to rewrite the same information, and the register subsystem includes write control circuits with means to override the signals from the register read buffer to selectively write to modify the word information.

10. The system as claimed in claim 9, further including a transfer buffer connected with means to receive information signals from either the register read buffer or the translator read buffer and to cooperate with the translator subsystem in processing the information.

11. The system as claimed in claim 9, in which the communication switching system includes a plurality of trunk circuits, wherein another of said subsystems is a trunk scan subsystem with means connected to the trunk circuits to scan the trunk circuits to determine their busy or idle status, and to record this information in the memory.

12. The system as claimed in claim 11, wherein said translator subsystem includes route selector apparatus and corresponding sections of the memory, and wherein both the translator subsystem and the trunk scan subsystem are provided with means for access to the route selector sections of the memory.

13. The system as claimed in claim 9, wherein there are a plurality of register junctors associated with said register subsystem, and wherein the address generator of the register subsystem includes means which supplies cyclically recurring time slot signals individual to the register junctors, so that each register junctor during its time slot has exclusive use of the register processing circuits; each register junctor having an individual section of the memory to which the register subsystem has access during the time slot of that register junctor.

14. The system as claimed in claim 13, wherein said memory comprises a plurality of rows of bistable storage elements, each row storing one word of information and having an address individual thereto;

wherein the section of memory individual to each register junctor comprises a plurality of rows, including at least one control row and at least one data row, wherein the register address generator includes means which supplies a plurality of sub-time slot signals cyclically recurring during each register time slot, access to each row being provided by coincidence of a register time slot and a sub-time slot signal, with each data row address being individual to one sub-time slot signal so that it is addressed once per cycle, and each control row having its address generated during one sub-time slot proceding and one sub-time slot following the data row addresses; and wherein the register subsystem includes storage devices with means to receive information from the register read buffer during the occurrrence of particular sub-time slots for use during the occurrence of later sub-time slots in cycle, and means which clear these storage devices at the end of every register time slot.

15. The system as claimed in claim 14, further including a transfer buffer with means connected to receive information signals from either the register read buffer or the translator read buffer and means to supply information via the register write control circuits into a designated row of the memory section of the appropriate register junctor.

16. The system as claimed in claim 15, with the communication switching system having a plurality of trunk circuits, wherein one said subsystems is a trunk scan subsystem having means connected to the trunk circuit to scan the trunk circuit for their busy or idle status and to record this information in a route selector section of the memory, there being means to also provide acccess to this section of the memory for the translator subsystem for use in selecting a route for a call.

17. The system as claimed in claim 13, further including a transfer buffer with means to receive information signals from either the register read buffer or the translator read buffer and to supply information signals via the register write control circuits to supply information into the section of memory for the appropriate register junctor, the transfer buffer having means to cooperate in the translator subsystem to be seized for use by a particular register junctor and to receive information signals from the memory section for that register junctor via the register read buffer, means to compare the information with information read from memory via the translator read buffer to obtain routing information, and to supply this information via the register write control circuits to the memory section for that register junctor.

18. The system as claimed in claim 17, wherein the translator subsystem includes means to supply addresses to its address generator as determined by the required translation.

19. The system as claimed in claim 18, with the communication switching system having a plurality of trunk circuits, wherein another of said subsystems is a trunk scan subsystem with means connected to the trunk circuits to scan the trunk circuits for their busy or idle status and to record this information in the memory.

20. The system as claimed in claim 19, wherein there is a route selector section of the memory which is provided with access by both the trunk scan subsystem and the translator subsystem, and wherein the translator address generator after being set to a particular address for a route selector section has means to advance sequentially to find an available trunk circuit required for the route for a particular call, the translator subsystem further having means to cause information to be written into the row of the selected trunk circuit to indicate that it has been selected for use.

References Cited

UNITED STATES PATENTS

| | | | |
|---|---|---|---|
| 3,221,103 | 11/1965 | Adelaar et al. | 179—18 |
| 3,223,976 | 12/1965 | Abbott et al. | 340—172.5 X |
| 3,328,534 | 6/1967 | Murphy et al. | 179—18 |
| 3,401,380 | 9/1968 | Bell et al. | 340—172.5 |
| 3,403,383 | 9/1968 | Kienzle et al. | 340—172.5 |
| 3,408,628 | 10/1968 | Brass et al. | 340—172.5 |
| 3,247,488 | 4/1966 | Welsh et al. | |
| 3,348,210 | 10/1967 | Ochsner. | |
| 3,469,239 | 9/1969 | Richmond et al. | |

PAUL J. HENON, Primary Examiner

S. R. CHIRLIN, Assistant Examiner

UNITED STATES PATENT OFFICE
CERTIFICATE OF CORRECTION

Patent No. 3,533,073 Dated October 6, 1970

Inventor(s) Howard L. Wirsing et al.

It is certified that error appears in the above-identified patent and that said Letters Patent are hereby corrected as shown below:

Column 15, line 54, after "one" insert -- of --; line 56, "circuit", each occurrence, should read -- circuits --.

Signed and sealed this 9th day of March 1971.

(SEAL)
Attest:

EDWARD M.FLETCHER,JR.
Attesting Officer

WILLIAM E. SCHUYLER, JR.
Commissioner of Patents